United States Patent [19]
Savage

[11] Patent Number: 5,326,210
[45] Date of Patent: Jul. 5, 1994

[54] MACHINE FOR AUTOMATICALLY LOADING BAR STOCK

[76] Inventor: Gerald R. Savage, c/o Sharon Screw Products, Inc., 1928 12th St., Rockford, Ill. 61104

[21] Appl. No.: 112,615

[22] Filed: Aug. 26, 1993

[51] Int. Cl.⁵ .................. B23B 13/04; B23B 13/10
[52] U.S. Cl. ............................ 414/17; 414/18; 414/746.1
[58] Field of Search ............ 414/15, 17, 18, 745.9, 414/746.1; 82/126, 127

[56] References Cited

U.S. PATENT DOCUMENTS 3,612,298  10/1971  Azuma ...................... 414/18 X

FOREIGN PATENT DOCUMENTS 55-52813   1/1980  Japan ..................... 414/746.1
291324    12/1986  Japan ..................... 414/746.7

OTHER PUBLICATIONS

4-Page brochure dated 1990 and entitled "IEMCA Bar Feeders With Hydraulic Suspension Feeding for CNC Lathes and Automatics".
1-Page advertisement (publication date unknown) and entitled "A Case Study of IEMCA Bar Feeders".
1-Page advertisement (publication date unknown) and entitled "IEMCA Automatic Bar Feeder".
6-Page brochure published by Pietro Cucchi & Co. (publication date unknown) and entitled "AN-BN Model".
1-Page advertisement published by P. Cucchi (publication date unknown and entitled "Turn Your Multi-Spindles Into World Class Producers".

*Primary Examiner*—Michael S. Huppert
*Assistant Examiner*—Janice Krizek
*Attorney, Agent, or Firm*—Leydig, Voit & Mayer

[57] ABSTRACT

A machine for automatically loading elongated bars into an automatic screw machine. Each bar initially is advanced at a rapid rate and with relatively low force by a first fluid-operated actuator. When the leading end of the bar reaches the feed finger of the screw machine, a second fluid-operated actuator advances the bar at a slower speed and with relatively high force. A measuring device measures the distance through which the bar is advanced by the second actuator and automatically stops the advance when the leading end of the bar is located in a predetermined position.

13 Claims, 8 Drawing Sheets

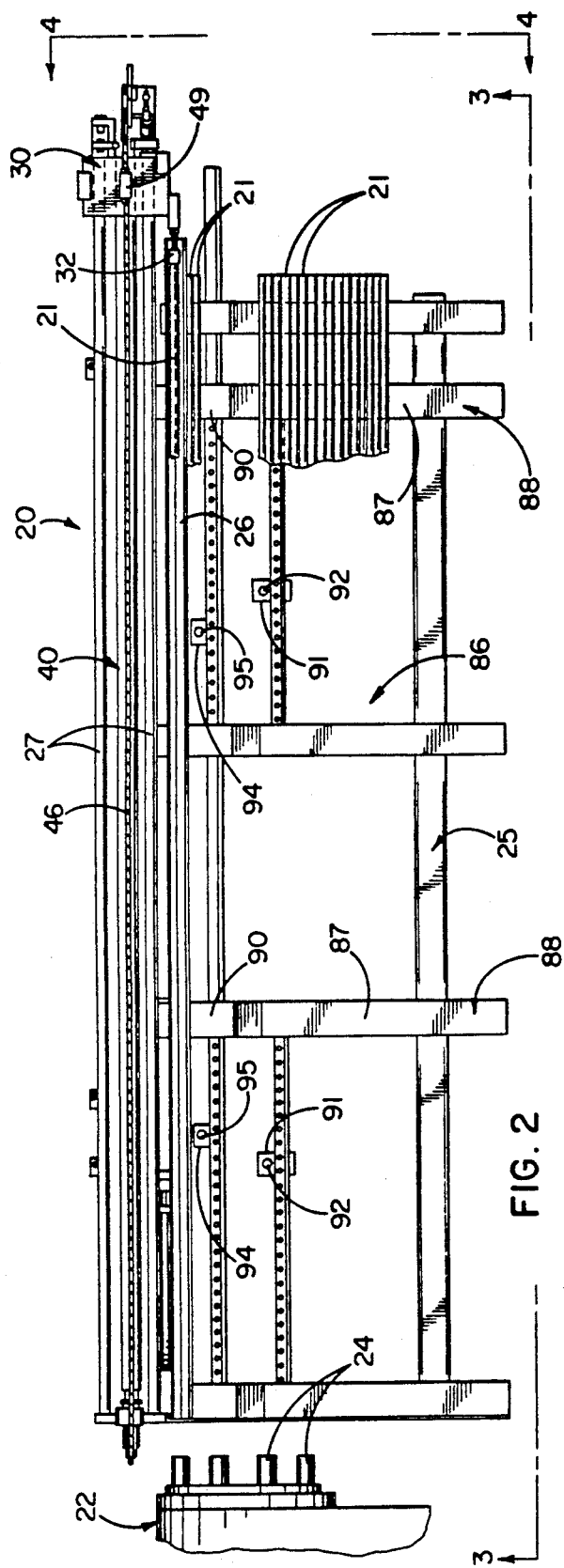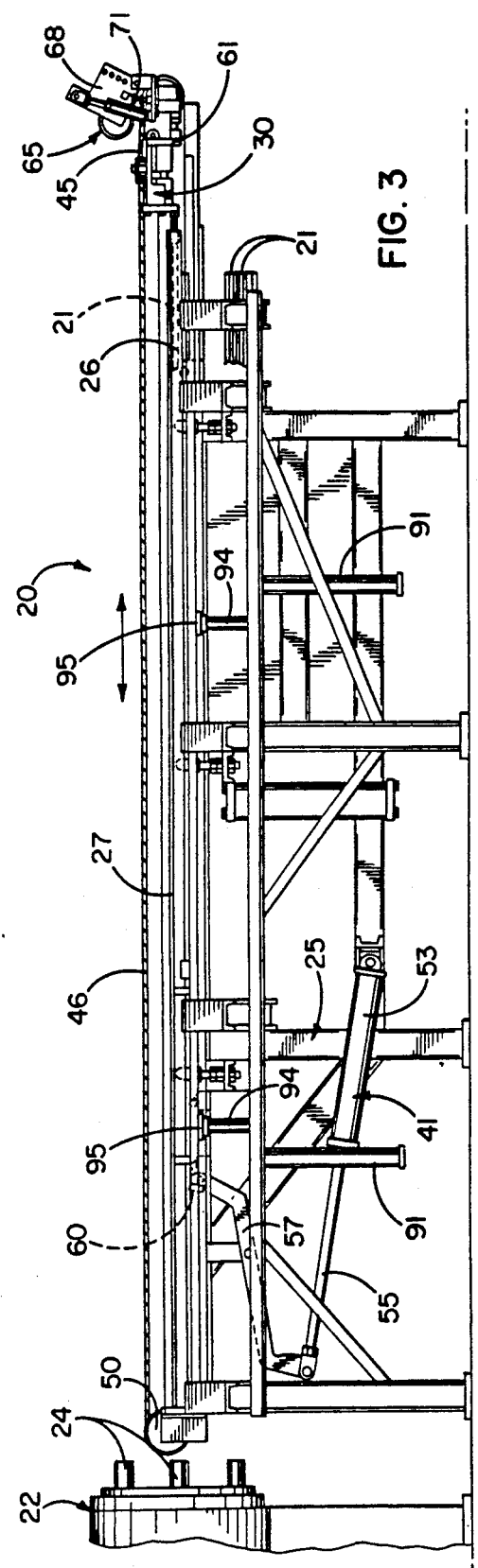

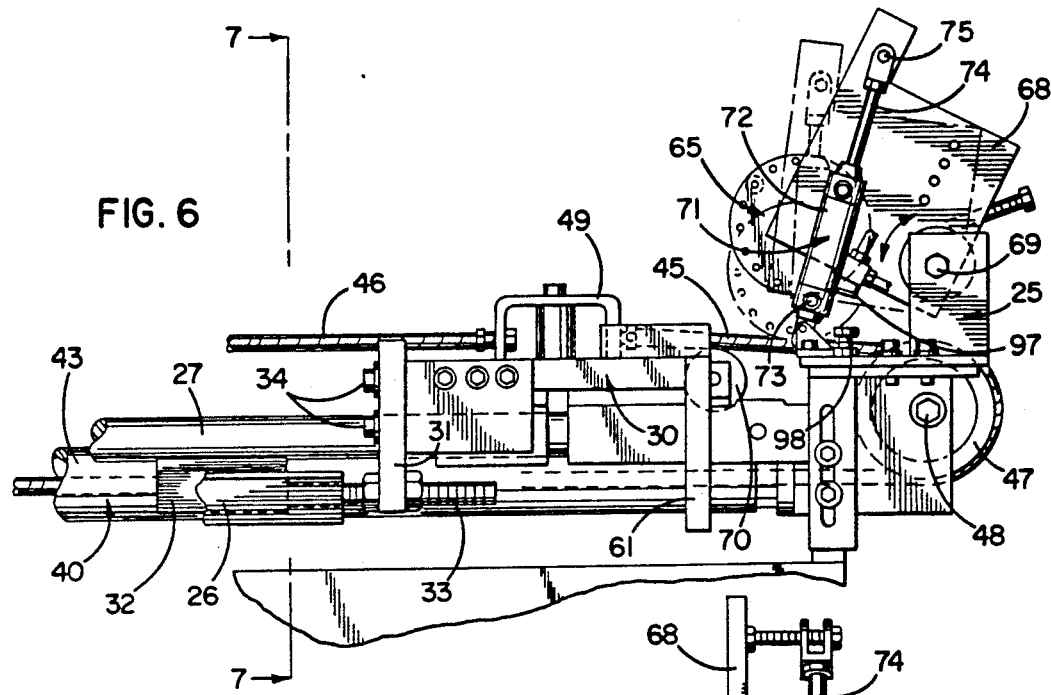
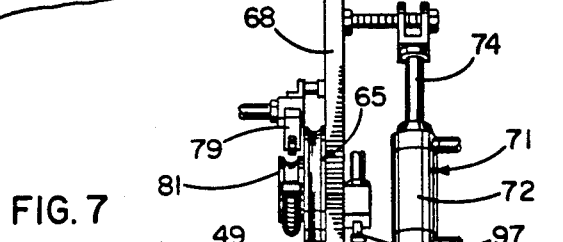
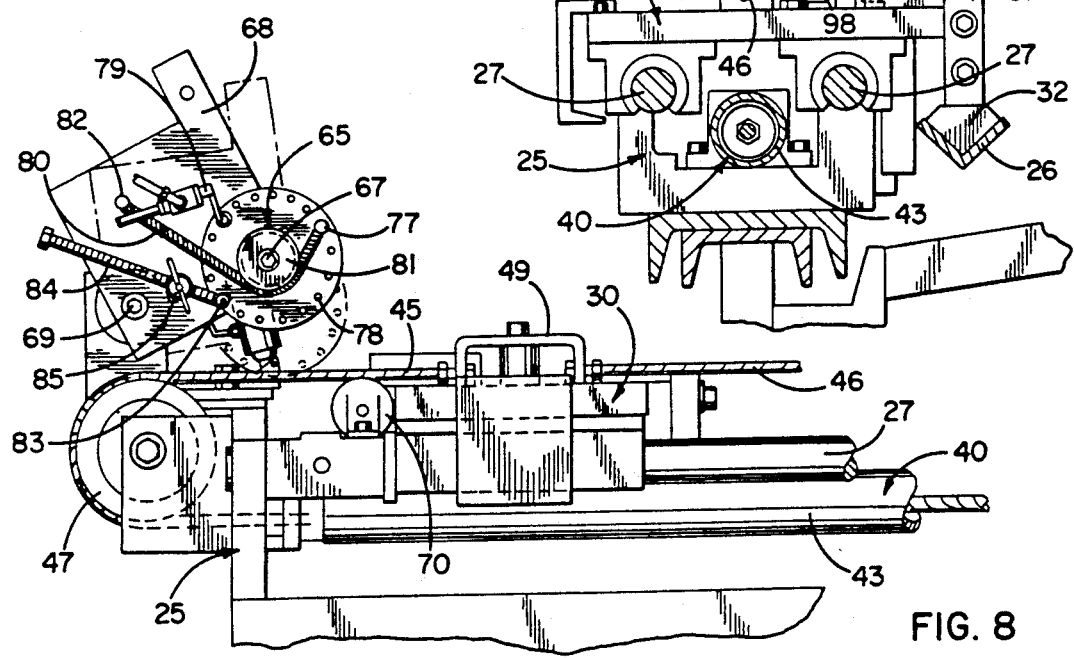

FIG. 10

MACHINE FOR AUTOMATICALLY LOADING BAR STOCK

BACKGROUND OF THE INVENTION

This invention relates to apparatus for automatically loading elongated bar stock into the tool holder of a machine tool. A typical machine tool with which the present apparatus is especially adapted for use is a multiple spindle automatic screw machine. In machines of this type, an indexable stock reel is located ahead of the machine collets and carries a plurality (e.g., six) of tubes for guiding the bars toward the collets. Typically, a feed finger is located between each collet and the downstream end of each stock tube for incrementally feeding the bar into the screw machine once the bar has been turned over to the screw machine by the loader.

It is desirable for the loader to deliver the bars to the stock reel and through the stock tubes at a rapid rate. Substantial force, however, is needed to feed the bars through the feed fingers and to the collets. Also, it is desirable for final movement of the bars through the feed fingers to be at a relatively slow rate for purposes of positional accuracy.

While machines exist for loading bars first at a rapid rate and then at a slower rate, such machines are extremely complex. Also, prior art loading machines usually are customized for a particular type of automatic screw machine and do not readily lend themselves for use with different makes and models of screw machines.

SUMMARY OF THE INVENTION

The general aim of the present invention is to provide a new and improved automatic bar loading machine which, when compared to prior machines, is of much simpler and less expensive construction and which is easily adaptable for use with virtually all types of automatic screw machines.

A more detailed object of the invention is to provide a bar loading machine in which the bars are loaded into the screw machine by means of two reciprocating fluid-operated actuators; there being a first such actuator for advancing the bars rapidly and through a relatively long distance to and through the stock tubes and there being a second actuator for advancing the bars relatively slowly and with high force through the feed fingers.

Still another object is to provide a loading machine in which a measuring device coacts uniquely with a cable to measure the distance through which a bar is advanced by the high force actuator and to effect stopping of the bar when its leading end is in a precisely predetermined location.

A related object is to provide a measuring device which may be quickly, easily and precisely adjusted to change the distance through which the bar is advanced by the high force actuator.

The invention also resides in the provision of a novel two-level stock rack enabling a large supply of bars to be manually loaded into the loading apparatus without lifting the bars through a great height and enabling bars thereafter to be supplied automatically and individually to the loading apparatus.

These and other objects and advantages of the invention will become more apparent from the following detailed description when taken in conjunction with the accompanying drawings.

BRIEF DESCRIPTION OF THE DRAWINGS

FIG. 2 is a top plan view of the bar loader.

FIG. 3 is a front elevational view as seen substantially along the line 3—3 of FIG. 2.

FIG. 6 is an enlarged front elevational view primarily showing the carriage and the measuring device.

FIG. 7 is a fragmentary cross-section taken substantially along the line 7—7 of FIG. 6.

FIG. 8 is an enlarged rear elevational view primarily showing the carriage and the measuring device.

FIGS. 9 and 10 are enlarged fragmentary front elevational views showing different positions of the carriage and the measuring device.

Figure 1:
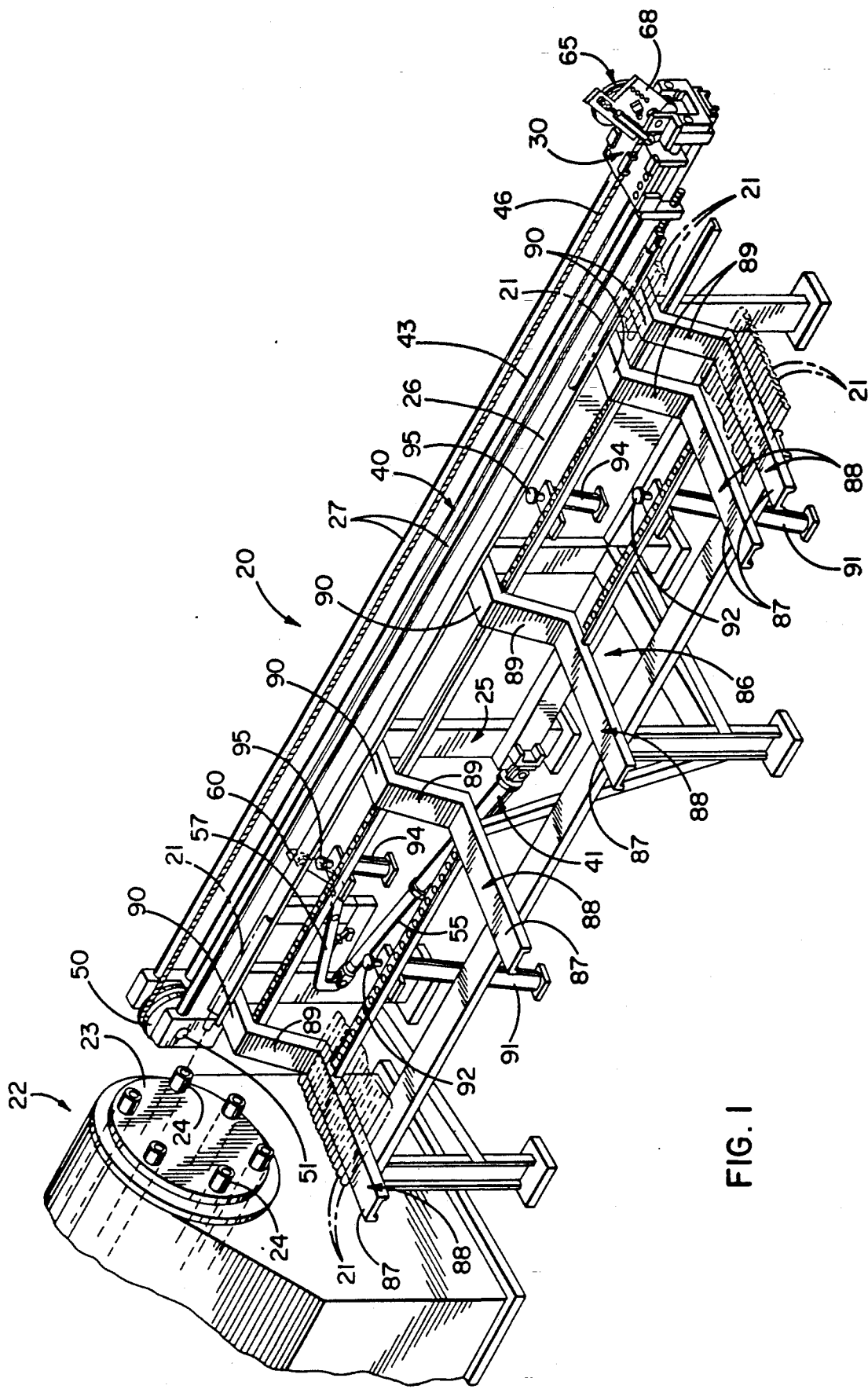
FIG. 1 is a perspective view showing a new and improved bar loader incorporating the unique features of the present invention in conjunction with a typical machine tool.
Figure 4:
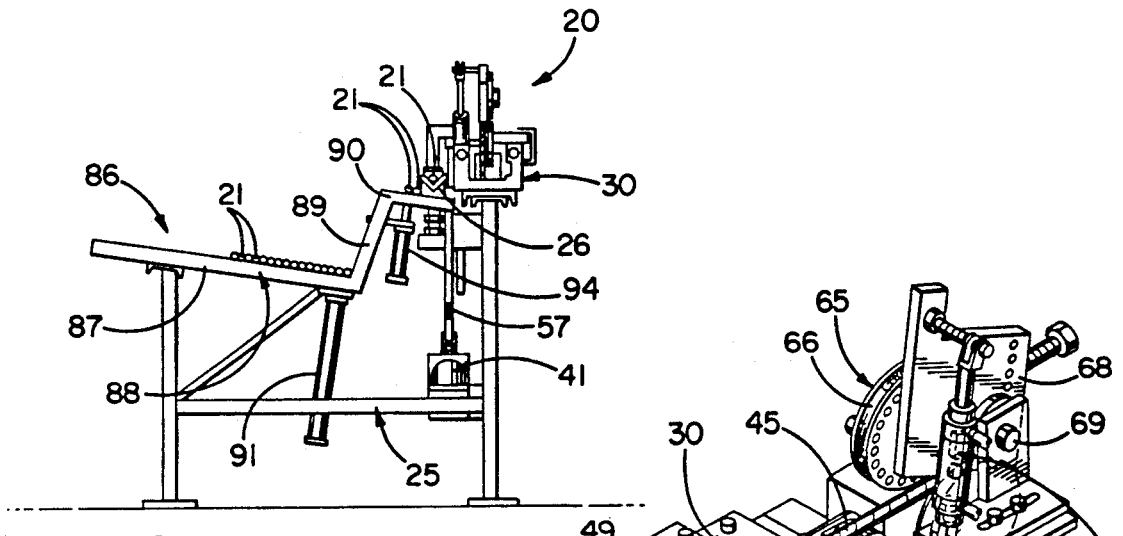
FIG. 4 is an end view as seen substantially along the line 4—4 of FIG. 2.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as embodied in apparatus 20 for loading elongated bars 21 into the work holders of a machine tool 22. While the bar loading machine 20 may be used with various types of machine tools, it is especially useful in conjunction with a multi-spindle automatic screw machine. The screw machine 22 which has been specifically shown includes an indexable stock reel 23 having a plurality (herein, six) of elongated stock tubes 24 which form part of the work holders of the screw machine. The work holders also include pushers or feed fingers (not shown) located downstream of the stock tubes 24 and further include collets (not shown) located down-stream of the feed fingers. The stock tubes 24 are significantly larger in diameter than the bars 21 and thus the bars may be moved through the tubes with relatively low force. A significantly higher force is required to shift the bars through the feed fingers and into the collets. Typically, the bars range between 10 and 20 feet in length.

The bar loading machine 20 includes a main support or frame which has been indicated in its entirety by the reference numeral 25, the frame including various support legs and structural frame members. Attached rigidly to and extending longitudinally of the frame is an elongated guide member 26 for supporting a bar 21 and for guiding the bar to one of the stock tubes 24 when the tube is indexed to an active receiving location disposed approximately at a three o'clock position as shown in FIG. 1. In this instance, the guide member is an angle iron which is oriented so as to define an upwardly opening V-shaped cradle for the bar. As will be explained subsequently, bars are automatically placed one-by-one into the guide member 26.

Located above the bar guide member 26 and attached rigidly to the frame 25 are two longitudinally extending, transversely spaced and parallel guide rods 27 which support a carriage 30 for movement toward and away from the stock reel 23. Attached to the front side of the carriage is a depending bracket 31 which supports a bar pusher 32. In the embodiment shown in FIG. 5A, the pusher is adapted for use in conjunction with large diameter bars and is in the form of a rather massive metal block whose shape is complementary to that of the V-shaped guide member 26. The pusher 32 is connected to the bracket 31 by a horizontal adjusting screw 33 and the bracket, in turn, is connected for vertical adjustment relative to the carriage 30 by screws 34.

Figure 5A:
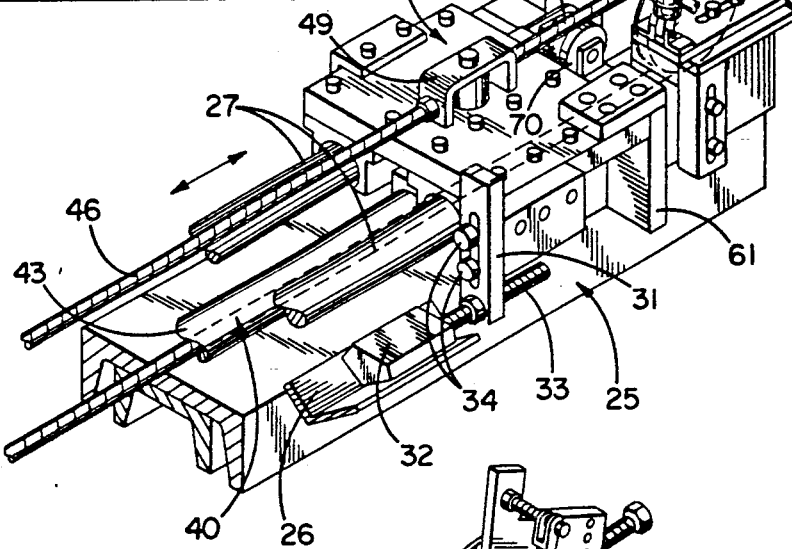
FIG. 5A is a fragmentary perspective view primarily showing the carriage and the measuring device.
Figure 5B:
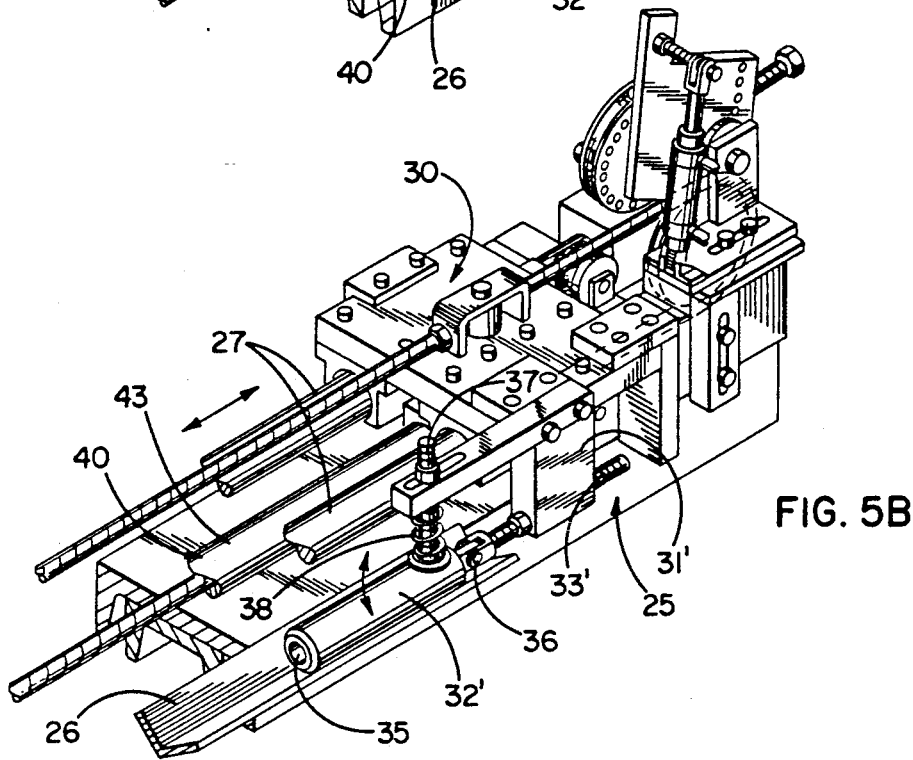
FIG. 5B is a view similar to FIG. 5A but shows a carriage with a modified bar pusher.

FIG. 5B shows a modified pusher 32' which is adapted to handle relatively small diameter bars 21 and, advantageously, to accommodate the wobble or flimsiness of such bars. The pusher 32' is in the form of a cylindrical rod having a socket 35 in one end for telescopically receiving the trailing end of the bar. The trailing end of the pusher rod 32' is attached to a horizontal adjusting screw 33' to swing upwardly and downwardly about a transversely extending horizontal pivot 36, the screw being attached to a bracket 31' connected to the carriage 30. Also attached to the bracket is a vertical adjusting screw 37 supporting a coil spring 38 which is sandwiched between the bracket and the pusher rod 32' so as to bias the latter downwardly about the pivot 36. With this arrangement, the pusher rod 32' is capable of limited vertical pivoting and may accommodate any wobble or unevenness in small diameter rods.

When the carriage 30 is shifted forwardly along the guide rods 27, the pusher 32, 32' engages the trailing end of the bar 21 in the guide member 26 and shoves the bar forwardly toward the stock tube 24 in the active receiving position. In accordance with the present invention, forward shifting of the carriage 30 is effected by two reciprocating fluid-operated actuators 40 and 41. The first actuator 40 advances the carriage and the bar 21 at a relatively rapid rate to shift the bar to and through the relatively large diameter stock tube 24. Thereafter, the second actuator 41 advances the carriage and the bar at a slower speed and with significantly greater force in order to insert the leading end portion of the bar through the feed finger and into the collet of the screw machine 22. As will become more apparent subsequently, the use of the two fluid-operated actuators 40 and 41 makes the bar loading machine 20 of relatively simple and inexpensive construction and enables the loading machine to be used universally with various types and models of screw machines.

More specifically, the actuator 40 includes a long cylinder 43 (FIGS. 5A, 7 and 11) affixed rigidly to the frame 25 below and between the guide rods 27 and extending virtually the entire length of the frame. Slidable within the cylinder is a piston member 44 (FIG. 11) which is adapted to advance forwardly and retract rearwardly when pressurized fluid is admitted into the rear and forward end portions, respectively, of the cylinder. In this instance, the piston 44 is actuated by pressurized air rather than a more complex hydraulic system since only relatively low force is required to move the bar 21 to and through the stock tube 24.

Figure 11:
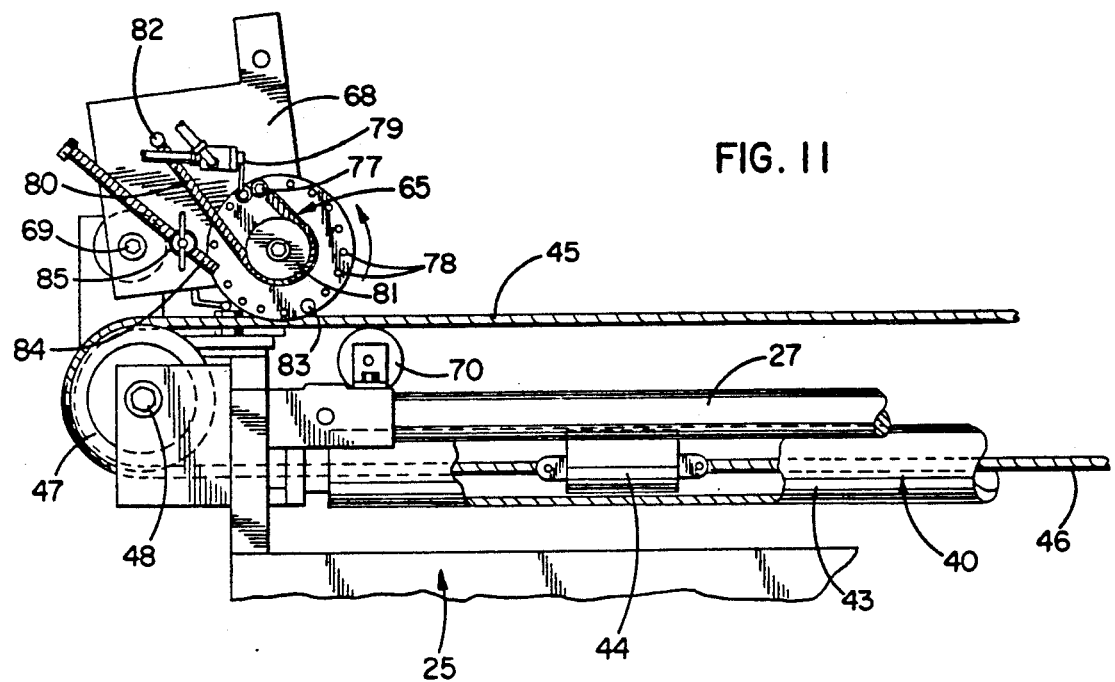
FIG. 11 is an enlarged fragmentary rear elevational view primarily illustrating the measuring device and showing the device positioned differently from FIG. 8.

The actuator 40 also includes two elongated flexible cables 45 and 46 (FIGS. 5A, 6 and 11). One end of the cable 45 extends into the rear end of the cylinder 43 and is attached to the rear end of the piston 44. The cable 45 extends rearwardly from the cylinder and is trained upwardly and forwardly around a pulley 47 (FIG. 6) rotatably journaled at 48 on the rear end portion of the frame 25. At its other end, the cable 45 is secured to an inverted U-shaped bracket 49 attached to the upper side of the carriage 30.

In a similar fashion, one end of the cable 46 extends into the forward end of the cylinder 43 and is attached to the forward end of the piston 44. The cable 46 extends forwardly from the cylinder and upwardly and rearwardly around a pulley 50 (FIG. 1) rotatably supported at 51 on the forward end portion of the frame 25. The rear end of the cable 46 is attached to the forward end of the bracket 49.

With the foregoing arrangement, rearward shifting of the piston 44 within the cylinder 43 of the actuator 40 pulls the cable 46 which, in turn, pulls the carriage 30 forwardly along the guide rods 27. When the piston is shifted forwardly, the cable 45 pulls the carriage rearwardly.

At the beginning of a loading cycle, the carriage 30 is located in its rearmost position shown in FIG. 6 and a bar 21 is located in the guide member 26 ahead of the pusher 32, 32'. A cycle is initiated by the screw machine 22 producing a pneumatic "need stock" signal which effects shifting of a valve (not shown) to a position pressurizing the forward end of the cylinder 43 of the actuator 40. Accordingly, the piston 44 shifts rearwardly and causes the carriage 30 to shift forwardly. The pusher 32, 32' engages the trailing end of the bar 21 and shoves the bar forwardly at a relatively rapid rate (e.g., 150–175 feet per minute) toward, into and through the stock tube 24 in the active receiving position. Because the bar moves freely through the stock tube, only relatively low force need be exerted on the bar by the actuator 40 acting through the carriage 30. By way of example, the actuator 40 need only be capable of exerting a maximum of about 400 lbs. of force on the bar.

Figure 9:
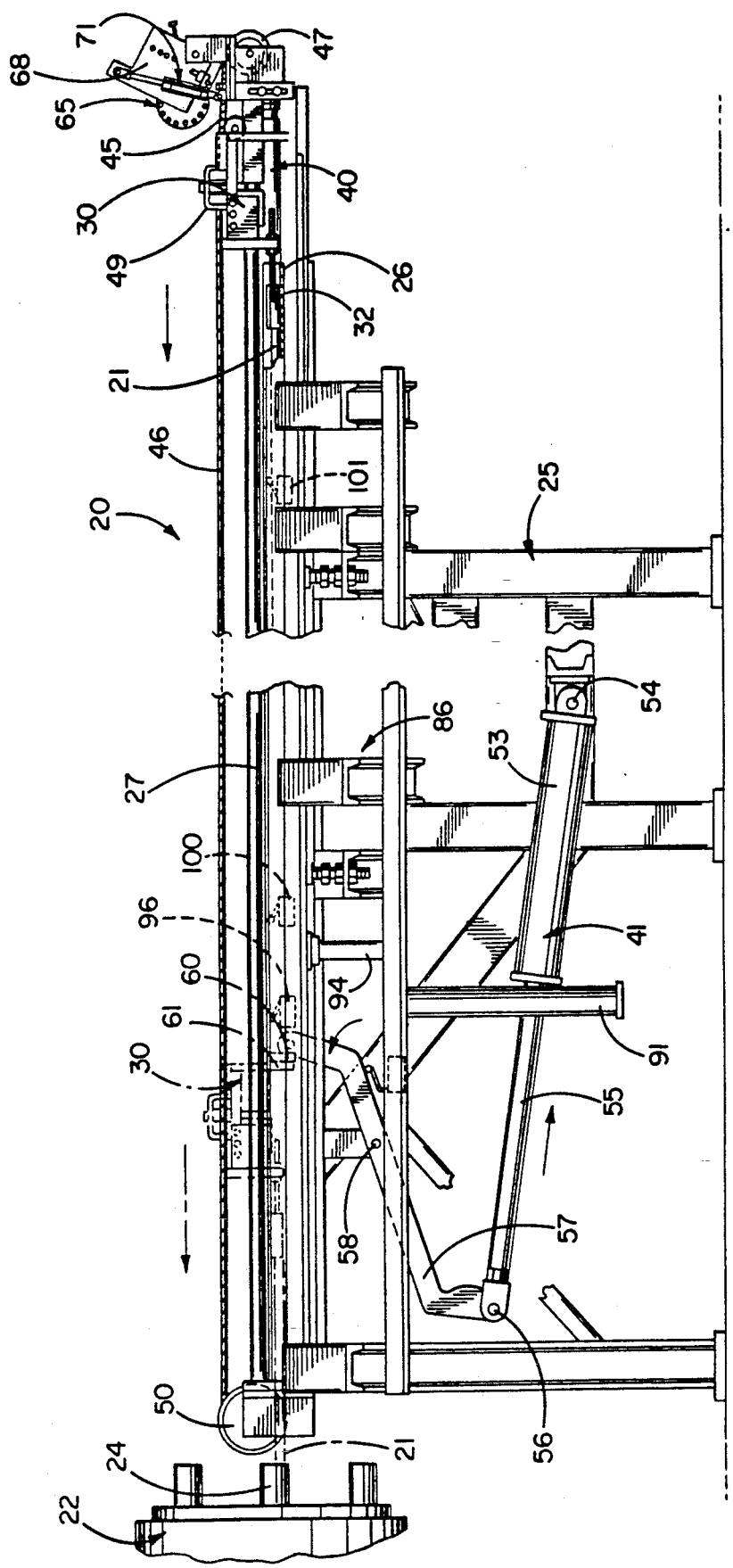

After the carriage 30 has moved through a relatively long stroke and has reached a position near the forward end portion of the frame 25 as shown in phantom lines in FIG. 9, the actuator 40 is disabled and the actuator 41 is triggered in order to shove the carriage further in a forward direction and to cause the pusher 32, 32' to shove the bar 21 forwardly at significantly slower speed and with significantly higher force in order to push the bar through the feed finger and into the collet of the screw machine 22. Herein, the actuator 41 comprises a cylinder 53 (FIG. 9) having a rear end pivotally connected to the frame 25 at 54. A rod 55 is reciprocable in the cylinder 53 and its forward end is pivotally connected at 56 to the lower end portion or arm of a lever 57 having an intermediate portion pivotally connected at 58 to the frame 25. The lever includes an upper arm that carries a pusher 60 which is shown as being a plate but which may simply be a roller on the upper end of the lever.

Figure 10:
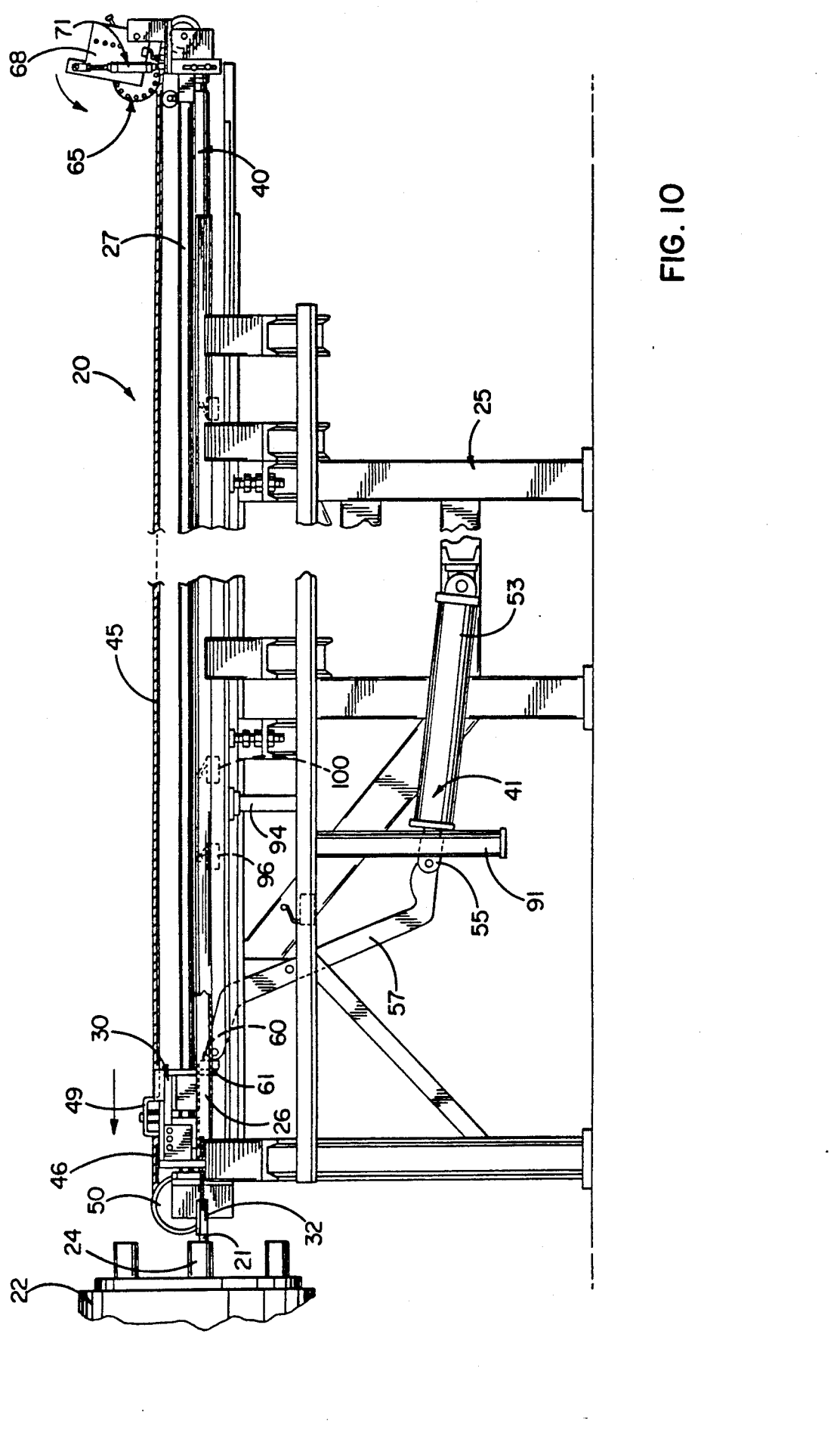
Figure 12:
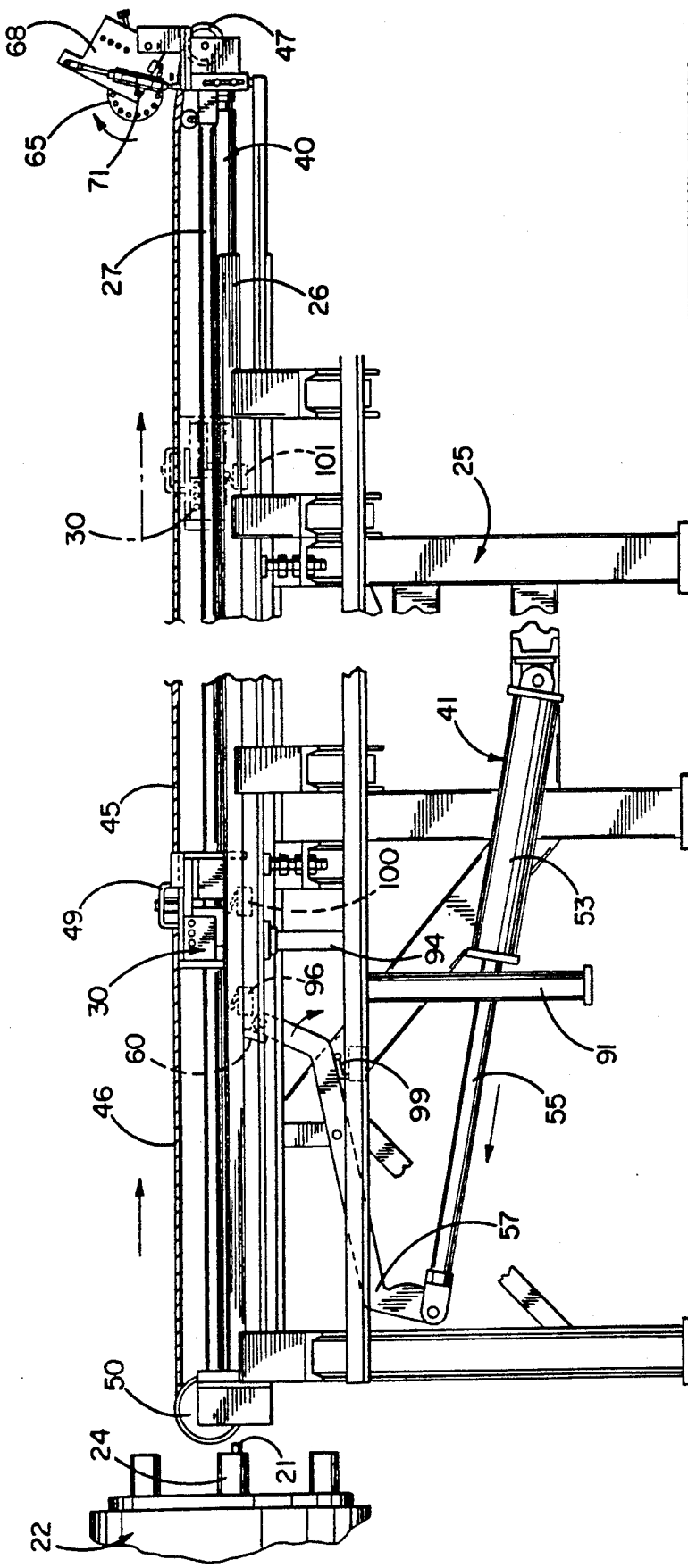
FIG. 12 is a view similar to FIGS. 9 and 10 but shows still other moved positions of the carriage.

When the rod 55 of the actuator 41 is in a fully extended position as shown in FIG. 12, the pusher 60 is located in an inactive position below the path followed by a plate 61 (FIG. 6) depending from the rear end of the carriage 30. After the carriage has been moved forwardly sufficiently by the actuator 40 to cause the plate 61 to clear the pusher 60, the rod 55 is retracted by pressurizing the forward end of the cylinder 53. Upon being retracted, the rod 55 swings the lever 57 counterclockwise about the pivot 58 and brings the pusher 60 into engagement with the plate 61 as shown in FIG. 9. With further retraction of the rod 55, the pusher 60 acts against the plate 61 to shove the carriage 30 and the bar 21 forwardly and thereby shift the bar through the feed finger and into the collet of the screw machine 22 (see FIG. 10). Shifting of the bar by the actuator 41 is effected at a relatively slow speed (e.g., ¼ that of the speed effected by the actuator 40) and at high force. The high force is accomplished by virtue of the cylinder 53 being of large capacity and capable of developing up to 2,000 lbs. of force. Also, the length of the lever 57 from the pivot 56 to the pivot 58 is greater than the length of the lever from the pivot 58 to the pusher 60 so that the lever amplifies the force of the actuator 41. While the actuator 41 may be a pneumatic actuator, it preferably is an actuator of the type operated by hydraulic oil which is pressurized by an air source. In this way, the dynamic smoothness of hydraulic actuation is achieved without the expense of a motor-driven hydraulic pump and other components of a hydraulic system.

The rod 55 of the actuator 41 is retracted and the carriage 30 and the bar 21 are pushed forwardly until the bar has moved through a predetermined distance and is located with its leading end in a predetermined position relative to the collet of the screw machine 22. At this time, the forward end of the cylinder 53 is depressurized and its rear end is pressurized in order to advance the rod 55, swing the lever 57 clockwise about the pivot 58 and retract the pusher 60 below the path of the carriage plate 61 to the position of FIG. 12. Thereafter, the rear end of the cylinder 43 of the actuator 40 is pressurized to advance the piston 44 forwardly and cause the cable 45 to pull the carriage 30 rearwardly to its fully retracted position near the rear end portion of the frame 25.

In carrying out the invention, the machine 20 is equipped with unique means for measuring the distance through which the bar 21 is advanced by the high force actuator 41 and for stopping movement of the bar after the latter has been advanced through a precisely predetermined distance. In this way, the leading end of the bar may be located in a precisely predetermined position relative to the collet of the screw machine 22.

More specifically, the measuring means comprise a wheel 65 whose periphery is circumferentially grooved as indicated at 66 in FIG. 5A to define a track for receiving the cable 45. The measuring wheel 65 is journaled at 67 (FIG. 8) on an upright mounting plate 68 to turn about a transversely extending horizontal axis. The mounting plate, in turn, is supported on the rear portion of the frame 25 at 69 to pivot upwardly and downwardly about a parallel axis. When the mounting plate is pivoted upwardly, the measuring wheel 65 is located in an upper inactive position in which the wheel is raised out of contact with the cable 45 as shown in full lines in FIG. 6. Upon downward pivoting of the plate 68, the wheel 65 is lowered to an active position (shown in phantom in FIG. 6) in which the bottom of the groove 66 is pressed tightly against the cable 45, there being an idler pulley 70 mounted on the frame 25 and underlying the cable 45 just forwardly of the wheel 65 to prevent any substantial downward deflection of the cable. Upward and downward pivoting of the mounting plate 68 is effected by a reciprocating pneumatic actuator 71 (FIG. 6) having a cylinder 72 whose lower end is pivotally connected to the frame 25 at 73 and having a rod 74 whose upper end is pivotally connected to the mounting plate at 75.

Whenever the measuring wheel 65 is in its lowered active position and the cable 45 is pulled forwardly, the wheel is rotated in a counterclockwise direction as viewed in FIGS. 8 and 11. A switch actuator 77 (FIG. 8) in the form of a screw is carried by the wheel in one of a series of tapped holes 78 formed transversely through and spaced circumferentially around the outer peripheral portion of the wheel. After the wheel has been rotated a predetermined distance by the cable 45, the switch actuator 77 engages and triggers a pneumatic limit switch 79 supported on the mounting plate 68. Upon being triggered, the switch initiates a sequence (to be explained subsequently) to cause the rod 55 of the actuator 41 to advance and thereby retract the pusher 60 out of engagement with the carriage plate 61. Accordingly, forward pushing of the bar 21 is terminated whenever the measuring wheel 65 turns sufficiently far to cause the switch actuator 77 to trigger the switch 79.

As viewed in FIGS. 8 and 11, a contractile spring 80 biases the measuring wheel 65 to turn in a clockwise direction, one end of the spring being anchored to the wheel by the switch actuator screw 77. The spring loops around a pulley 81 fixed rigidly to and coaxial with the wheel and its opposite end is anchored at 82 to the mounting plate 68. When the switch 79 is actuated, it causes a valve (not shown) to shift and cause the actuator 71 to pivot the mounting plate 68 upwardly so as to raise the measuring wheel 65 out of engagement with the cable 45. As an incident thereto, the spring 80 rotates the wheel clockwise (FIGS. 8 and 11) until a stop screw 83 in one of the holes 78 hits the end of an elongated screw 84 adjustably supported on the mounting plate at 85. The initial or starting position of the wheel 65 may be coarsely adjusted by placing the stop screw 83 in a different one of the holes 78 and may be finely adjusted by turning the screw 84 to change the position of the end thereof. Thus, the distance through which the wheel must rotate before the switch actuator screw 77 triggers the switch 79 may be changed by means of the screws 83 and 84 and also by placing the switch actuator screw in a different one of the holes 78.

Advantageously, the machine 20 includes a two-level stock rack 86 (FIGS. 1 and 13) which enables a large supply of bars 21 to be loaded manually into the machine without need of lifting the bars through a laborsome and possibly injurious height. In addition, the stock rack 86 effects automatic loading of individual bars into the guide member 26.

Figure 13:
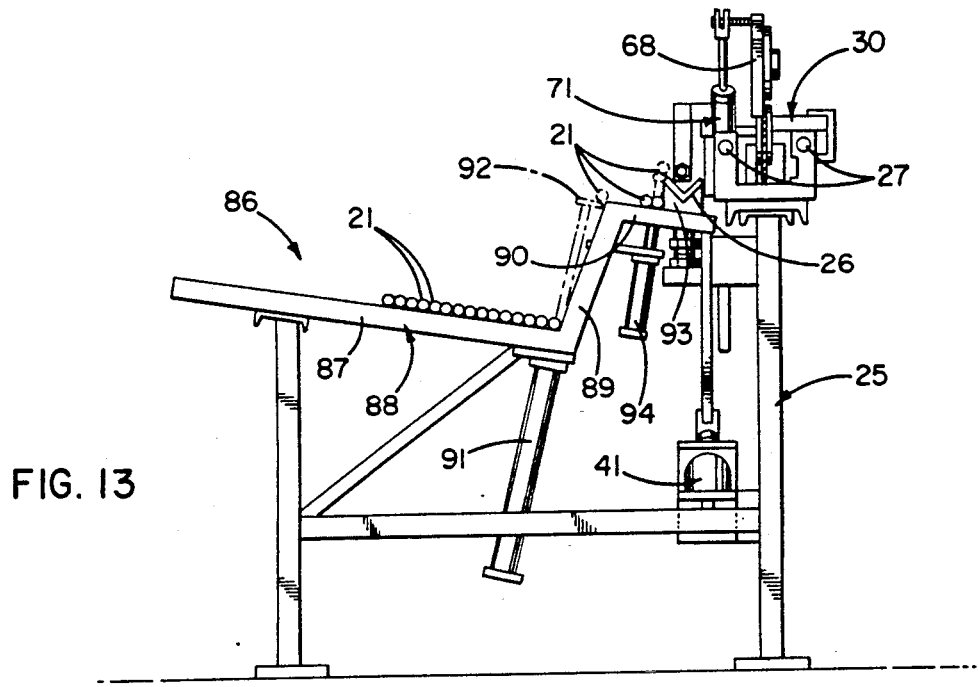
FIG. 13 is an enlarged version of FIG. 4 and shows certain components in moved positions in phantom lines.

As shown most clearly in FIGS. 1 and 13, the stock rack 86 includes a lower level which is defined in part by lower generally horizontal but somewhat downwardly inclined horizontal sections 87 of longitudinally spaced and transversely extending members 88 secured to the frame 25. Each rack member includes an upright section 89 at the inboard end of the horizontal section 87 and further includes a second generally horizontal but somewhat downwardly inclined section 90 at the upper end of the upright section and extending beneath the guide member 26.

The generally horizontal lower sections 87 of the stock rack members 88 are located only approximately 30" above floor level and thus several bars 21 may be manually loaded onto those sections without lifting the bars through a significant height. Upon being loaded, the bars gravitate downwardly until the leading bar is stopped by the upright sections 89 of the rack members 88. Periodically—and as will be explained in more detail subsequently—the leading bar on the lower sections 87 is automatically lifted therefrom and placed on the upper sections 90. For this purpose, longitudinally spaced reciprocating pneumatic actuators 91 (FIGS. 1 and 13) are fixed to the frame 25 in slightly vertically inclined positions and their rods carry small platens 92. When the rods of the actuators 91 are advanced upwardly, the platens 92 engage the lower side of the leading bar 21 on the lower sections 87 and lift that bar upwardly to the upper sections 90, the bar riding upwardly along the upright sections 89 during such lifting. Upon being raised above the upright sections 89, the bar rolls off of the platens 82 and onto the upper sections 90. The bar then rolls downwardly along those sections until it is stopped, either by support brackets 93 (FIG. 13) for the guide member 26 or by a previously loaded bar. Typically, two or three bars are located on the upper sections 90 at any given time.

Two additional longitudinally spaced reciprocating pneumatic actuators 94 (FIGS. 1 and 13) are supported in slightly vertically inclined positions on the frame 25 adjacent the guide member 26 and include rods which carry platens 95 on their upper ends. Periodically, the rods of the actuators 94 are advanced, causing the platens 95 to lift the leading bar 21 on the upper sections 90. Upon being lifted, such bar rides upwardly along the brackets 93 and, when the upper end of the guide member 26 is cleared, rolls off of the platens and into the guide member.

Now that the basic components of the machine 20 have been explained, a typical operating cycle will be described. Assume that, prior to the start of a cycle, a bar 21 is in the guide member 26, the carriage 30 is in its fully retracted position with the pusher 32, 32' located behind the trailing end of the bar, the mounting plate 68 is pivoted upwardly with the measuring wheel 65 located in its raised inactive position, and the rod 55 of the actuator 41 is fully advanced so that the pusher 60 is in its lowered inactive position (see FIGS. 1-3). Assume further that the switch actuator 77, the screw 83 and the screw 84 have been set such that the angular distance between the switch actuator and the switch 79 corresponds to the linear distance through which it is desired to advance the bar 21 with the actuator 41 and the pusher 60. Finally, assume that several bars have been manually loaded onto the lower sections 87 of the rack members 88, that two or three bars are on the upper sections 90 of the rack members and that the rods of the actuators 91 and 94 are retracted.

As discussed above, a cycle is initiated by the screw machine 22 producing a pneumatic "need stock" signal, which causes the actuator 40 to shift the carriage 30 and the bar 21 forwardly. When the carriage 30 approaches the forward end portion of the frame 25 and after the bar has been inserted into the stock tube 24 in the receiving position, the carriage engages and triggers a pneumatic limit switch 96 (FIG. 9) which sets a pneumatic timer (not shown). Triggering of the limit switch 96 also effects de-pressurization of the forward end of the cylinder 43 so as to terminate positive pulling of the carriage by the cable 46. The carriage, however, continues to move forwardly a short distance (e.g., 8–12 inches) by coasting on the guide rods 27. The carriage coasts until the plate 61 of the carriage clears the pusher 60 and until the leading end of the bar hits and stops against the feed finger of the screw machine 22. By virtue of the bar being stopped against the feed finger, a known lengthwise reference location for the bar is established.

The timer times out about 0.3 seconds after being set. In so doing, the timer effects shifting of a valve (not shown) which causes the actuator 71 to be pressurized to pivot the mounting plate 68 downwardly and lower the measuring wheel 65 into its active position in engagement with the cable 45. When the measuring wheel reaches its active position, a pneumatic limit switch 97 (FIG. 6) on the mounting plate 68 engages and is triggered by an actuating screw 98 on the frame 25.

Triggering of the limit switch 97 effects shifting of a valve (not shown) to cause pressurization of the forward end of the cylinder 53 of the actuator 41. As a result, the rod 55 retracts and acts through the lever 57 to cause the pusher 60 to engage the carriage plate 61 and cause the carriage 30 to shove the bar 21 forwardly at a relatively slow speed and with relatively high force through the feed finger of the screw machine 22 (see the phantom line illustration of FIG. 9 and the full line illustration of FIG. 10).

As soon as the actuator 41 starts moving the carriage 30 forwardly, the cable 45 starts turning the measuring wheel 65 (counterclockwise as viewed in FIGS. 8 and 11) by virtue of the frictional engagement between the wheel and the cable. As the carriage 30 and the cable 45 continue to move forwardly, the wheel 65 continues to turn. When the carriage has been advanced a predetermined distance by the actuator 41 as determined by the settings of the switch actuator 77 and the screws 83 and 84, the switch actuator engages and triggers the limit switch 79. This causes the rod of the actuator 71 to advance upwardly and swing the mounting plate 68 upwardly so as to raise the measuring wheel out of engagement with the cable 45 and permit the spring 80 to rotate the wheel reversely until the screw 83 hits and stops against the screw 84. As the mounting plate 68 swings upwardly, the limit switch 97 leaves the actuating screw 98 and produces a signal for causing shifting of the valve for effecting de-pressurization of the forward end of the cylinder 53 of the actuator 41 and pressurization of the rear end of such cylinder. As a result, the rod 55 advances and acts through the lever 57 to retract the pusher 60 downwardly away from the carriage plate 61 and to the inactive position shown most clearly in FIG. 12.

When the pusher 60 reaches its retracted position shown in FIG. 12, the lever 57 engages and triggers a pneumatic limit switch 99. As a result, the control valve for the actuator 40 is shifted to pressurize the rear end of the cylinder 43 of that actuator. The piston 44 thus starts moving forwardly and acts through the cable 45 to pull the carriage 30 rearwardly. As the carriage moves rearwardly, it triggers an electrical limit switch 100 (FIG. 12) to effect indexing of the stock reel 23 and thereby bring the next stock tube 24 into the active receiving position. As the carriage approaches the rear end of the frame 25, it triggers another pneumatic limit switch 101 to effect depressurization of the rear end of the cylinder 43. Thereafter, the carriage 30 coasts rearwardly to its original starting position.

Triggering of the limit switch 101 by the carriage 30 also sets a pneumatic timer (not shown) which, upon timing out, causes valves (not shown) to operate the rods of each of the actuators 91 and 94 through an upward stroke and then through a downward stroke. Upon being shifted upwardly, the rods of the actuators 91 lift the leading bar 21 in the lower rack sections 87 to the upper rack sections 90. Similarly, the upwardly shifting rods of the actuators 94 lift the leading bar in the upper rack sections 90 into the guide member 26 to prepare the machine 20 for the start of the next cycle.

From the foregoing, it will be apparent that the present invention brings to the art a new and improved automatic bar loading machine 20 which is of relatively simple, inexpensive and easy-to-maintain construction as a result of using fluid-operated actuators 40 and 41—and preferably pneumatically-operated actuators—to advance the bars 21 and as a result of the machine having only one electrical component, namely, the limit switch 100. Because the loading machine 20 itself advances each bar to a predetermined position relative to the screw machine 22, the latter machine need not be capable of preliminarily positioning the bar and thus the loading machine lends itself to use with many different makes and models of screw machines. The loading machine is relatively accurate, being capable of positioning the leading end of the bar within 0.030" of its desired location on a worst case basis, and is relatively fast. A single loading cycle can be achieved in a range of 9–12 seconds and all six stock tubes 24 can be loaded in less then 75 seconds.

I claim:

1. Apparatus for automatically loading elongated bars generally horizontally into the work holder of a machine tool, said apparatus comprising a main support having means for guiding a bar for lengthwise movement toward the work holder, a carriage mounted on said support for movement in first and second directions and operable when moved in said first direction to advance said bar along said guide means and toward said work holder, a first fluid-operated actuator for moving said carriage in said first direction through a first distance, a second fluid-operated actuator for thereafter moving said carriage in said first direction with a greater force and at a slower speed than said first actuator, and means for measuring displacement of said carriage in said first direction by said second actuator and for disabling said second actuator after said carriage has been moved through a second distance by said second actuator.

2. Apparatus as defined in claim 1 in which said second fluid-operated actuator includes a reciprocating rod, a lever having one end portion pivotally connected to said rod and having an intermediate portion pivotally connected to said support, a pusher on the other end portion of said lever, said pusher being retracted to an inactive position located out of the path of movement of the carriage when said rod is shifted in one direction, and said pusher moving into an active position in pushing engagement with said carriage when said rod is shifted in the opposite direction.

3. Apparatus as defined in claim 1 further including cable means connected between said first actuator and said carriage and operable to pull said carriage when said first actuator is operated, said measuring means comprising a wheel engageable with and turnable in one circumferential direction by said cable means during shifting of said carriage in said first direction, a control switch which is operable when triggered to disable said second actuator, and a switch actuator movable with said wheel for triggering said switch when said wheel rotates through a predetermined distance in said one circumferential direction.

4. Apparatus as defined in claim 3 in which said switch actuator may be selectively adjusted to different angular positions on said wheel.

5. Apparatus as defined in claim 3 in which said wheel normally is in an inactive position out of engagement with said cable means, means for moving said wheel into engagement with said cable means after said carriage has been moved through said first distance thereby to enable said cable means to turn said wheel in said one circumferential direction, means responsive to movement of said wheel into engagement with said cable means for enabling said second actuator to move said carriage, and means responsive to movement of said carriage through said second distance for causing said wheel to move to said inactive position.

6. Apparatus as defined in claim 5 further including a spring for turning said wheel in the opposite circumferential direction immediately after said wheel is moved to said inactive position.

7. Apparatus as defined in claim 6 further including means for stopping turning of said wheel after said wheel has turned through a predetermined distance in said opposite circumferential direction, said stopping means being selectively adjustable to permit adjustment of the distance through which said wheel turns in said opposite circumferential direction.

8. Apparatus as defined in claim 1 further including a pusher movable with said carriage and engageable with one end of said bar to advance the bar toward said work holder, said pusher being mounted on said carriage to pivot upwardly and downwardly about a generally horizontal axis extending transversely of said guiding means, and spring means biasing said pusher downwardly about said axis and into engagement with said guiding means.

9. Apparatus as defined in claim 1 further including a storage rack for holding bars to be loaded, said storage rack having a lower level for holding a relatively large number of bars and having an upper level for holding a fewer number of bars, and means for transferring one bar at a time from said lower level to said upper level and for transferring one bar at a time from said upper level to said guiding means each time said carriage stops after moving in said second direction.

10. Apparatus for automatically loading elongated bars generally horizontally into the work holder of a machine tool, said apparatus comprising a main support having means for guiding a bar for lengthwise movement toward the work holder, a carriage movable on said support in first and second directions and operable when moved in said first direction to advance said bar along said guide means and toward said work holder, a first reciprocating fluid-operated actuator having a reciprocating member, flexible cable means connected to said reciprocating member and to said carriage whereby back and forth movement of said reciprocating member causes said cable means to pull said carriage in said first and second directions, said carriage being pulled in said first direction and through a first distance by said cable means when said reciprocating member is moved a predetermined distance in said second direction, a second fluid-operated actuator having a reciprocating rod, a pusher operably connected to said rod, said second actuator being operable, after said carriage has been moved through said first distance, to move said pusher into operative engagement with said carriage and to push said carriage in said first direction with greater force than exerted on said carriage by said first actuator and said cable means, and means for measuring displacement of said carriage in said first direction by said second actuator and for disabling said second actuator after the latter has pushed said carriage through a second distance.

11. Apparatus as defined in claim 10 further including a lever having first and second ends connected to said rod and said pusher, respectively, and a pivot mounting said lever on said support for swinging about a generally horizontal axis extending transversely of said guiding means, the distance between the first end of said lever and said pivot being greater than the distance between the second end of said lever and said pivot whereby said lever amplifies the force produced by said rod.

12. Apparatus as defined in claim 10 in which said measuring means comprise a wheel engageable with and turnable in one circumferential direction by said cable means during shifting of said carriage in said first direction, an electrical control switch which is operable when triggered to disable said second actuator, and a switch actuator movable with said wheel for triggering said switch when said wheel rotates through a predetermined distance in said one circumferential direction.

13. Apparatus as defined in claim 12 in which said wheel normally is in an inactive position out of engagement with said cable means, means for moving said wheel into engagement with said cable means after said carriage has been moved through said first distance thereby to enable said cable means to turn said wheel in said one circumferential direction, means responsive to movement of said wheel into engagement with said cable means for enabling said second actuator to move said carriage, and means responsive to movement of said carriage through said second distance for causing said wheel to move to said inactive position.

* * * * *